United States Patent [19]
Lacey

[11] Patent Number: 5,822,570
[45] Date of Patent: Oct. 13, 1998

[54] SYSTEM AND METHOD FOR PARSING AND EXECUTING A SINGLE INSTRUCTION STREAM USING A PLURALITY OF TIGHTLY COUPLED PARSING AND EXECUTION UNITS

[75] Inventor: Steve Lacey, London, England

[73] Assignee: Microsoft Corporation, Redmond, Wash.

[21] Appl. No.: 741,056

[22] Filed: Oct. 30, 1996

[51] Int. Cl.$^6$ .................................................. G06F 3/00
[52] U.S. Cl. ............................................ 395/500; 395/384
[58] Field of Search ................................. 395/500, 280, 395/842, 685, 800.03, 200.43, 384, 800.34

[56] References Cited

U.S. PATENT DOCUMENTS

| | | | |
|---|---|---|---|
| 4,077,060 | 2/1978 | Bodner et al. | 395/384 |
| 4,084,235 | 4/1978 | Hirtle et al. | 395/500 |
| 4,979,102 | 12/1990 | Tokuume | 395/200.43 |
| 5,133,070 | 7/1992 | Barker et al. | 707/513 |
| 5,202,975 | 4/1993 | Rasbold et al. | 395/685 |
| 5,371,860 | 12/1994 | Mura et al. | 395/842 |
| 5,430,884 | 7/1995 | Beard et al. | 395/800.03 |
| 5,493,655 | 2/1996 | Shen et al. | 395/280 |
| 5,630,164 | 5/1997 | Williams et al. | 395/500 |

*Primary Examiner*—Parshotam S. Lall
*Assistant Examiner*—David Ovedovitz
*Attorney, Agent, or Firm*—Workman, Nydegger, Seeley

[57] ABSTRACT

A system and method for dividing execution of an instruction stream among a plurality of tightly coupled instruction execution units is presented. The present invention couples a plurality of instruction execution units tightly and provides a mechanism whereby control may be passed from one instruction execution unit to another instruction execution unit without raising exceptions or terminating normal execution of the instruction stream. The present invention employs a caller instruction execution unit that has a complete parser and the capability to emulate at least a portion of the instruction stream and at least one partial instruction execution unit. The caller instruction execution unit passes control to the partial instruction execution unit and allows the partial instruction execution unit to execute as many instruction of the instruction stream as it can. When the partial instruction execution unit encounters an unimplemented instruction, it returns control to the caller instruction execution unit for emulation of the instruction. The caller instruction execution unit can then return control back to the partial instruction execution unit after emulation of the instruction. Several optimizations are presented that minimize the number of transitions between the caller instruction execution unit and the partial instruction unit.

31 Claims, 6 Drawing Sheets

SYSTEM AND METHOD FOR PARSING AND EXECUTING A SINGLE INSTRUCTION STREAM USING A PLURALITY OF TIGHTLY COUPLED PARSING AND EXECUTION UNITS

BACKGROUND OF THE INVENTION

1. The Field of the Invention

The present invention relates to systems and methods for dividing execution of an instruction stream among a plurality of tightly coupled instruction execution units. More specifically, the present invention may be used to divide execution of an instruction stream between a hardware instruction execution unit that implements a portion of an instruction set and an emulation instruction execution unit that implements the remainder of the instruction set.

2. The Prior State of the Art

When personal computers were first introduced, the options available were relatively limited and many computers were sold with substantially the same hardware. For example, the number of display devices available to choose from was fairly limited. Furthermore, the computing power of early computers was rather limited and the microprocessors used in these early computers possessed little or no inherent capacity to perform complex mathematical operations. Programs wishing to perform complex mathematical operations typically had to implement complex mathematical functions using the standard microprocessor instruction set. This approach gave programs the ability to perform complex mathematical functions, but resulted in rather slow performance.

In order to increase the performance of a computer performing complex mathematical operations, microprocessor manufacturers introduced math coprocessors that could be coupled to the microprocessor. The math coprocessors were adapted to execute an instruction set that made complex mathematical functions easier to perform. When the microprocessor encountered an instruction from the math coprocessor instruction set, the microprocessor could pass the instruction to the math coprocessor for execution.

The incorporation of math coprocessors into a computer system dramatically increased the speed of execution when performing complex mathematical functions. However, because of the cost involved in procuring and installing a math coprocessor, many computers were sold that did not contain math coprocessors. This created a dilemma for programmers writing programs that involved mathematical functions. On the one hand, programmers desired to take advantage of math coprocessors if they were available to increase the speed of execution of their programs. On the other hand, not all computers possessed a math coprocessor and the program still had to run successfully on a computer without a math coprocessor. The solution to this dilemma was to configure the program to take advantage of the math coprocessor if it was available, but emulate mathematical functions using the regular instruction set of the microprocessor if the math coprocessor was not available.

To perform this emulation, two general approaches were taken. In the first approach, a program would test whether a math coprocessor was available. If a math coprocessor was available, the program would then execute a portion of the code that used the math coprocessor. If a math coprocessor was not available, then the program executed a portion of the code that emulated the functionality of the math coprocessor without issuing instructions that used the math coprocessor. In this approach, the mathematical functions were either executed exclusively by the math coprocessor or the math coprocessor functionality was emulated exclusively on the microprocessor or Central Processing Unit CPU of the computer. The microprocessor or CPU never encountered an unimplemented instruction.

The second approach was for the program to continuously attempt to issue instructions that used the math coprocessor. When the microprocessor encountered an instruction for the math coprocessor, the microprocessor would raise an exception. An error handling routine, provided either by the operating system or by the program itself, would then examine the exceptions raised, determine if an instruction using the math coprocessor was the reason that the exception was raised. If so, the error handling routine would then emulate the instruction. Thus, in this method, every time an instruction is encountered that is unimplemented by the microprocessor, the microprocessor raises an exception and enters an error handling routine which must determine the instruction that raised the exception, emulate the instruction, and then attempt to reenter the instruction stream so that processing may continue. Note that in this model, the CPU performs both the emulation function of instructions that are not implemented and the direct hardware execution of instructions that are implemented.

Although the two approaches presented above have worked relatively well when dealing with emulation of mathematical functions, there currently does not exist a way for the CPU of a computer to employ a specialized processor to execute an instruction stream and then emulate on the CPU instructions in the instruction stream that are not implemented by the specialized processor. For example, consider a situation where an instruction set consists of various graphics instructions. These instructions may be used to program a special graphics coprocessor to perform rapid manipulation and display of various graphic objects. If the graphics coprocessor does not implement the entire graphics instruction set, then a situation can arise where a portion of the instruction set must be emulated by the CPU to fully execute an instruction stream containing instructions from the graphics instruction set. Presently, there does not exist a system or method that allows execution of such an instruction stream. Prior emulation methods were designed to have the CPU of the computer be both the primary execution processor and the emulation processor. Prior art methods do not, therefore, address how to use a specialized processor as the primary execution processor and emulate instructions on the CPU.

One approach to the problem might be to try and extend existing prior art approaches to cover this scenario. Although it is unclear if any attempt has ever been made to extend existing methods to cover this scenario, one approach might be to have the specialized processor execute the instruction stream until an unidentified instruction is found. The specialized processor could then raise an exception and call an error handling routine such as that implemented in the prior art. The error handling routine could then attempt to determine what the unidentified instruction was and emulate the unidentified instruction. If such an approach were taken, however, it is unclear where such an emulation process would reside and how the specialized processor would call such an error handling process.

Although such an approach may be tried, such an approach would require the specialized processor implement an exception handling method such as that used in microprocessors. Such an exception handling method may add complexity to the specialized processor. It would, therefore, be desirable to allow a specialized processor to execute part of an instruction stream and not require the specialized processor to use an exception or error handling routine to emulate unimplemented instructions. This is particularly important in operating systems that transition through several kernel layers when exceptions are raised. In these operating systems, after the error handling routine is complete, the operating system must retransition through several kernel layers to restart execution of the application. It is, therefore, preferred that the specialized processor have a method of emulating instructions that does not depend on exception handling and allows a controlled handling of unimplemented instructions.

Another problem that is not addressed by the present state of the art is the ability to vary the portion of the instruction set that is emulated by software and the portion of the instruction set that is implemented in hardware. For example, when the instruction set of a math coprocessor is emulated using an error handling routine, the error handling routine must be crafted to specifically implement all of the instructions in the math coprocessor instruction set. A situation is thus produced where the number of instructions implemented in the error handling routine is fixed. Either a computer has a math coprocessor, in which case no instructions are emulated or a computer does not have a math coprocessor, in which case all of the instruction set is emulated. Prior art methods make no provision for incrementally implementing portions of an instruction set in hardware. This is due primarily to the difficulty in crafting error handling routines to emulate various instructions.

The ability to handle the situation where more and more of the instruction set is implemented in hardware over time is an extremely important feature when dealing with a new specialized processor, such as the graphics processor referred to above. In such a situation, initially only a portion of the instruction set may be implemented in hardware. However, as technology improves, it may become feasible to implement a greater and greater degree of the instruction set in hardware. Thus, it would be important for an emulation process to be able to determine the portion of the instruction set implemented by the hardware and then modify its behavior to take maximum advantage of the hardware available. Prior art methods do not provide such a capability and are not readily adaptable to incorporate such a feature. It would, therefore, represent an advancement in the art to provide for a system and method of splitting execution of an instruction stream among a plurality of instruction execution units where the percentage of instructions handled by each instruction execution unit can be modified without rewriting any software.

SUMMARY AND OBJECTS OF THE INVENTION

The foregoing problems in the prior state of the art have been overcome by the present invention, which is directed to a system and method for dividing execution of an instruction stream among a plurality of tightly coupled instruction execution units. In one embodiment of the present invention, one instruction execution unit is a hardware instruction execution unit that implements at least a portion of an instruction set. Thus, this hardware instruction execution unit allows rapid execution of at least a portion of an instruction set. This partial instruction execution unit may then be coupled with a caller instruction execution unit that contains a complete instruction parser and a means for emulating those instructions that are not implemented by the partial instruction execution unit. In this context, a complete parser is a parser that is able to parse and interpret all instructions of the instruction set. Embodiments of the present invention therefore have at least one instruction execution unit with a partial parser and another execution unit with a complete parser.

Such a feature is lacking in the prior art approach to instruction emulation. For example, if the instruction set is taken to be the set of instruction set executed by the microprocessor and the instruction set executed by the math coprocessor, then each of the processors is a partial instruction execution unit. The microprocessor implements the microprocessor instruction set and the math coprocessor implements the math coprocessor instruction set. In situations where the math coprocessor is absent, then the microprocessor contains one parser capable of interpreting the microprocessor instruction set and a second parser (in the form of an exception handling routine) that also can interpret only a portion of the instruction set, namely those instructions that are emulated.

The use of one partial instruction execution unit and a caller instruction execution unit that contains a complete parser and a means for emulating at least a portion of the instruction set allows controlled handling of instruction execution using either the emulation means or the partial instruction execution unit. Operation of the invention may be summarized as follows. The partial instruction execution unit begins to parse and execute the instruction stream until it encounters an instruction that is unimplemented by the partial instruction execution unit. The partial instruction execution unit then passes control to the caller instruction execution unit. Since the caller instruction execution unit contains a complete parser, the caller instruction execution unit can examine the instruction that was unimplemented by the partial instruction execution unit. If, after examining the instruction, the caller instruction execution unit determines that the instruction should have been implemented by the partial instruction execution unit, then the caller instruction execution unit can raise an exception and terminate execution. If, on the other hand, the caller instruction execution unit determines that the instruction is indeed unimplemented by the partial instruction execution unit, then the caller instruction execution unit can emulate the instruction using means for emulating those instructions not implemented by the partial instruction execution unit.

At this point, the caller instruction execution unit can pass control directly back to the partial instruction execution unit. On the other hand, an optimization can take place that reduces the number of transitions between the partial instruction execution unit and the caller instruction execution unit. Because the caller instruction execution unit contains a complete parser, the caller instruction execution unit can examine the next instruction in the instruction stream and determine whether the next instruction is implemented by the partial instruction execution unit. If the instruction is implemented, control may be passed to the partial instruction execution unit. If the instruction is not implemented, then the caller instruction execution unit can emulate the instruction. By prechecking the next instruction in the instruction stream, the situation is eliminated where control is passed to the partial instruction execution unit, only to be immediately returned once again to the caller instruction execution unit. Absent the above optimization, this sequence of transitions occurs whenever two unimplemented instructions occur sequentially in an instruction stream.

In order to make most efficient use of the partial instruction execution unit and to achieve tight coupling between the partial instruction execution unit and the caller instruction execution unit, the caller instruction execution unit can determine which instructions in the instruction set are implemented by the partial instruction execution unit and which instructions in the instruction set are not implemented by the partial instruction execution unit. This may be achieved in a number of ways. For example, since the partial instruction execution unit is typically hardware, when the hardware is installed, information about what instructions are implemented may be stored for later reference by the caller instruction execution unit. As an alternative, the caller instruction execution unit may perform an initialization step where the partial instruction execution unit and the caller instruction execution unit exchange sufficient information to allow the caller instruction execution unit to determine which instructions are implemented and which instructions are not implemented.

Allowing the caller instruction execution unit to determine what instructions are implemented by the partial instruction execution unit provides a great advantage over the prior art. It allows an incremental approach to increasing the capacity of the partial instruction execution unit. For example, consider a caller instruction execution unit that has the capacity to emulate the entire instruction set. Then during an initialization step, or through other means, the caller instruction execution unit identifies the instructions implemented by the partial instruction execution unit. Now the caller instruction execution unit can make sure that instructions implemented by the partial instruction execution unit are executed by the partial instruction execution unit. If the number of instructions executed by the partial instruction execution unit changes, simply performing the initialization step again will adapt the caller instruction execution unit to the new capabilities of the partial instruction execution unit. A similar process would work when adding additional partial instruction execution units.

Embodiments of the present inventions are not limited to a single partial instruction execution unit and a single caller instruction execution unit. A plurality of partial instruction execution units may be combined under the control of a single caller instruction execution unit that contains a complete parser.

Accordingly, it is a primary object of the present invention to provide systems and methods for dividing an instruction stream among a plurality of tightly coupled instruction execution units where transition of control between the instruction execution units is performed in an orderly manner without the use of exceptions. Other objects of the present invention include: providing systems and methods for dividing execution of an instruction stream between one execution unit that contains a complete parser and a caller instruction execution unit that contains only a partial parser; providing systems and methods for dividing execution of an instruction set between a plurality of instruction execution units that allows emulation of instructions to occur while minimizing the transition between instruction execution units; and providing systems and methods for dividing execution of an instruction stream among a plurality of instruction execution units that can be easily adapted to changes in the number of instructions implemented by each instruction execution unit.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
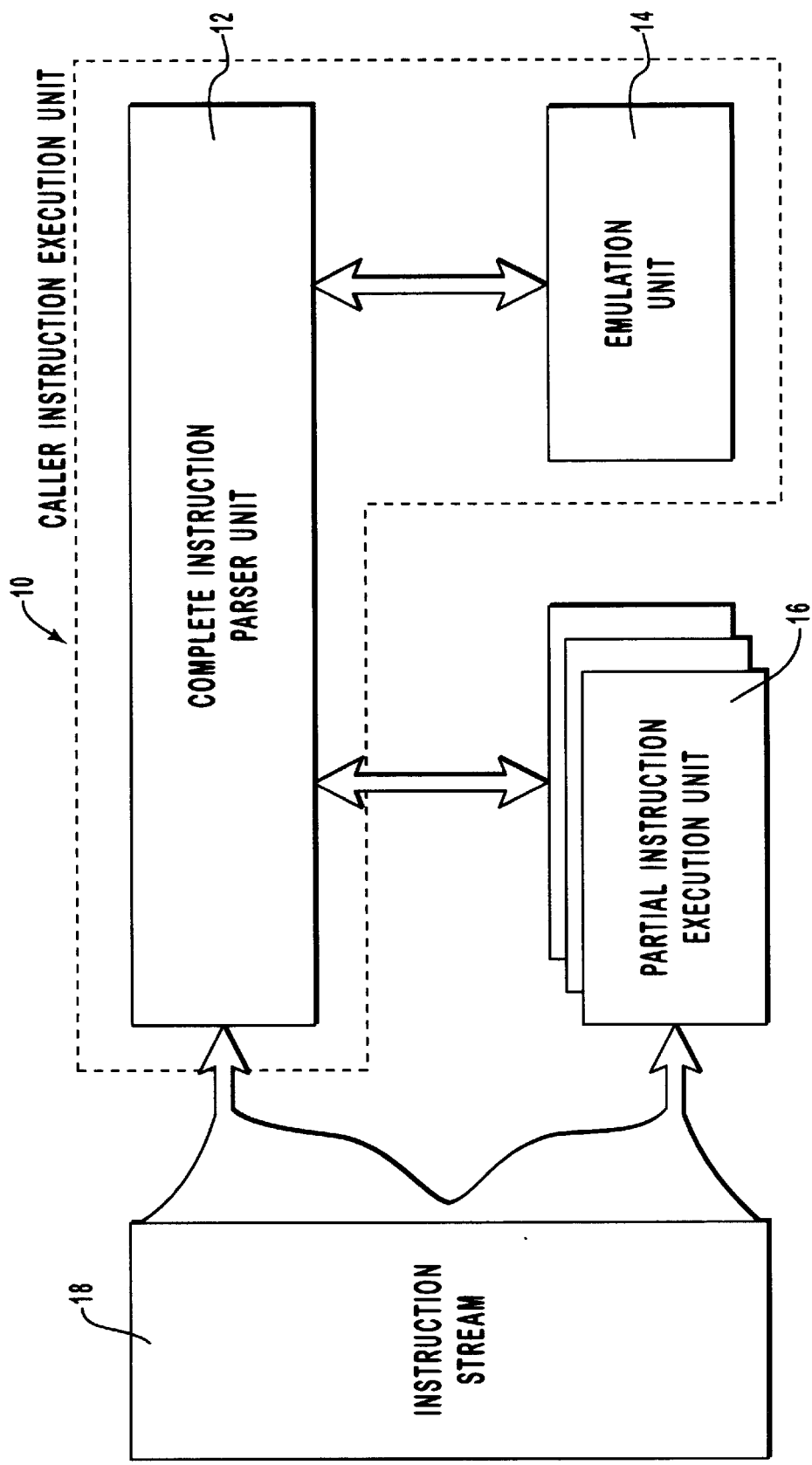
FIG. 1 is a top level diagram of one embodiment of the present invention.

The following invention is described by using flow diagrams to illustrate either the structure or the processing of certain embodiments that implement the systems and methods of the present invention. Using the diagrams in this manner to present the invention should not be construed as limiting of its scope. The present invention contemplates both systems and methods for dividing execution of an instruction stream among a plurality of tightly coupled instruction execution units. Embodiments of systems for dividing execution of an instruction stream among a plurality of tightly coupled instruction execution units may comprise a general purpose computer. Such a general purpose computer may have any number of basic configurations. For example, such a general purpose computer may comprise a central processing unit (CPU), one or more specialized processors, system memory, a mass storage device such as a magnetic disk, an optical disk, or other storage device, an input means such as a keyboard or mouse, a display device, and a printer or other output device. A system implementing the present invention can also comprise a special purpose computer or other hardware system and all should be included within its scope.

Embodiments within the scope of the present invention also include computer program products comprising computer readable medium having embodied therein program code means. Such computer readable media can be any available media which can be accessed by a general purpose or special purpose computer. By way of example, and not limitation, such computer readable media can comprise RAM, ROM, EEPROM, CD ROM or other optical disk storage, magnetic disk storage or other magnetic storage devices, or any other medium which can embody the desired program code means and which can be accessed by a general purpose or special purpose computer. Combinations of the above should also be included within the scope of computer readable media. Program code means comprises, for example, executable instructions and data which cause a general purpose computer or special purpose computer to perform a certain function or a group of functions.

The purpose of the present invention is to allow instructions of an instruction stream to be executed as quickly as possible. This is achieved by taking advantage of any specialized hardware that can execute some of the instructions of the instruction set in an accelerated fashion. Thus, embodiments of the present invention will allow hardware execution units to execute as much of the instruction stream as possible. Where instructions cannot be executed by a hardware instruction execution unit, then control will be passed to another instruction execution unit where the instruction will be emulated. Control is then returned to the hardware execution unit. Embodiments within the scope of this invention therefore comprise a plurality of means for parsing and executing instructions of an instruction set. In this invention, some of the means for parsing and executing instructions of the instruction set will only parse and execute a portion of the instruction set. Other means for parsing and executing the instruction set will be able to parse the entire instruction set and execute either all or part of the instruction set.

Turning now to FIG. 1, a high level diagram of one embodiment of the present invention is presented. As illustrated in FIG. 1, embodiments of the present invention comprise means for parsing and executing instructions of an instruction set, such as the caller instruction execution unit shown generally as 10. Caller instruction execution unit 10 comprises means for parsing the entire instruction set. In FIG. 1, such means is illustrated, for example, by complete instruction parser unit 12. Complete instruction parser unit 12 has the capability to parse and understand all the instructions of an instruction set. Furthermore, as explained in greater detail below, complete instruction parser unit 12 may also comprise the functionality necessary to decide what to do with a particular instruction once it has been parsed in order to achieve the most rapid execution of the instruction. For example, complete instruction parser unit 12 may comprise means for deciding to emulate an instruction. Complete instruction parser unit 12 may also comprise means for passing control to a different instruction execution unit so that the different instruction execution unit can parse and execute the instruction. Furthermore, complete instruction parser unit 12 may also comprise means for receiving control from another instruction execution unit if the other instruction execution unit cannot execute a particular instruction. Complete instruction parser unit 12 may then examine the instruction and decide if it should be emulated or if it should be sent to another instruction execution unit for execution.

Caller instruction execution unit 10 may also comprise means for emulating at least a portion of the instruction set. By way of example, and not limitation, in FIG. 1 such means for emulating is illustrated by emulation unit 14. As described in greater detail below, emulation unit 14 may comprise means for emulating all or part of the instruction set. In some embodiments, it may be desirable to create emulation unit 14 with the capability of emulating an entire instruction set. This way, caller instruction execution unit 10 may be used without modification on any system with any type or number of other instruction execution units to fill in and emulate those instructions not implemented by other instruction execution units. As explained in greater detail below, caller instruction execution unit 10 can examine the hardware available and then select or utilize only that portion of emulation unit 14 which contains instructions that are not implemented in other hardware instruction execution units. In this way, a single caller instruction execution unit may work with any number of other instruction execution units that only implement a portion of the instruction set.

As described above, embodiments within the scope of this invention comprise a plurality of means for parsing and executing an instruction set. Caller instruction execution unit 10 has means for parsing the entire instruction set and means for emulating at least a portion of the instruction set. However, embodiments within the scope of this invention may comprise one or more means for parsing and executing at least a portion of the instruction set. By way of example, and not limitation, such means for parsing and executing is illustrated in FIG. 1 by partial instruction execution unit 16. Partial instruction execution unit 16 typically comprises means for parsing a portion of the instruction set and means for executing a portion of the instruction set. In other words, partial instruction execution unit 16 comprises both an incomplete parser and incomplete means for executing instructions. As described in greater detail below, partial instruction execution unit 16 generally comprises specialized hardware, along with an appropriate driver, that is adapted for directly executing at least a portion of the instruction set. If partial instruction execution unit 16 encounters an instruction that is unimplemented, the instruction may be passed to caller instruction execution unit 10 which, because it incorporates a complete instruction parser unit, can decode and understand the instruction and decide how to best handle the instruction.

As described in greater detail below, caller instruction execution unit 10 and partial instruction execution unit 16 combine to form a plurality of tightly integrated instruction execution units that can efficiently divide execution of an instruction stream, as for example, instruction stream 18 of FIG. 1, between them. Although, covered in greater detail below, operation of the present invention proceeds as follows. Caller instruction execution unit 10 signals partial instruction execution unit 16 to begin executing instructions of instruction stream 18. Partial instruction execution unit 16 begins parsing and executing instructions from instruction stream 18 until either the entire instruction stream has been executed or until an unimplemented instruction is encountered. If partial instruction execution unit 16 encounters an instruction that cannot be understood, partial instruction execution unit passes control of execution to caller instruction execution unit 10.

When control is passed to caller instruction execution unit 10, complete instruction parser unit 12 examines the instruction that could not be executed by partial instruction execution unit 16. If the instruction is an instruction that should have been executed by partial instruction execution unit 16, then complete instruction parser unit 12 can raise an exception indicating that an error has occurred during execution. This error can then be handled by another process or by the operating system as generally implemented in the art. If, however, complete instruction parser unit 12 determines that the instruction is not one that is implemented by partial instruction execution unit 16, then complete instruction parser unit 12 may send the instruction to another partial instruction execution unit for execution or, if no other partial instruction execution unit is available, may send the instruction to emulation unit 14 for emulation. After the instruction has been executed, either by another partial instruction execution unit or by emulation unit 14, complete instruction parser unit 12 may return control to partial instruction execution unit 16.

In order to minimize any transitions that occur between partial instruction execution unit 16 and caller instruction execution unit 10, an optimization may be implemented. When caller instruction execution unit 10 has control of executing the instruction stream, complete instruction parser unit 12 may parse the next instruction in order to determine if it is implemented by partial instruction execution unit 16. If the next instruction is implemented by partial instruction execution unit 16, then control may be passed to partial instruction execution unit 16. If, on the other hand, the next instruction is not implemented by partial instruction execution unit 16, then complete instruction parser unit 12 may handle executing the instruction through emulation unit 14 or another partial instruction execution unit. Performing this test saves a transition of control to partial instruction execution unit 16 and back to caller instruction execution unit 10 when two unimplemented instructions occur in a row.

Other optimizations may be possible. For example, complete instruction parser unit 12 may begin decoding the next instruction while, simultaneously, signaling partial instruction execution unit 16 to begin execution of the next instruction. In this way, both complete instruction parser unit 12 and partial instruction execution unit 16 are beginning to decode the instruction. If the instruction is implemented by partial instruction execution unit 16, then complete instruction parser unit 12 may simply stop execution and wait for control to be passed back to caller instruction execution unit 10 by partial instruction execution unit 16. This saves the time required by partial instruction execution unit 16 to decode the next instruction. If, on the other hand, the instruction is not implemented, then partial instruction execution unit 16 will attempt to pass control back to caller instruction execution unit 10. Caller instruction execution unit 10, however, has already understood that it needs to take control and therefore can begin emulating the instruction sooner than it would have been able to otherwise.

Although a wide variety of technologies may be used to implement caller instruction execution unit 10 and partial instruction execution unit 16, in one embodiment partial instruction execution unit 16 is a specialized processor other hardware designed to directly execute a portion of the instructions in an instruction set. Such a processor or hardware may also comprise an appropriate driver that provides necessary functionality such as an interface between any hardware and software. Caller instruction execution unit 10 may also be implemented using an wide variety of technologies. In one embodiment, caller instruction execution unit 10 is implemented using program code means executing on the CPU of a computer. However, these are only examples and should not be construed to limit the scope of this invention.

Figure 2:
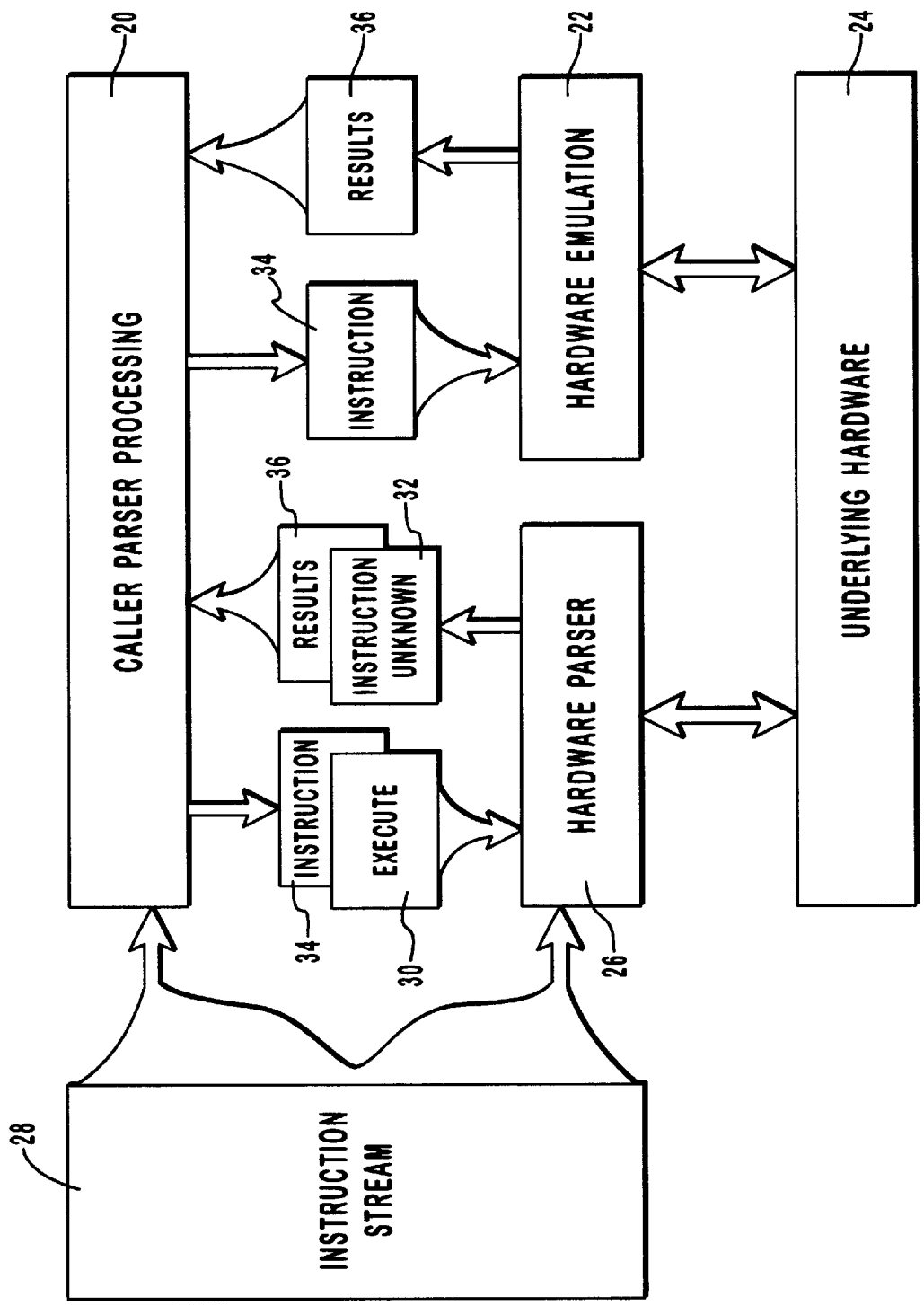
FIG. 2 is a more detailed top level diagram of one embodiment of the present invention.

Referring next to FIG. 2, a more detailed illustration of an embodiment of the present invention is presented. As previously described, embodiments within the scope of this invention may comprise means for parsing the entire instruction set. By way of example, in FIG. 2, such means is illustrated by caller parser processing block 20. Caller parser processing block 20 contains the ability to parse the entire instruction set. Thus, caller parser processing block 20 is one way of implementing complete instruction parser unit 12 of FIG. 1. Caller parser block 20 is responsible for making decisions on how to best execute the instruction stream. For example, caller parser processing block 20 may perform any of the functions described in conjunction with complete instruction parser unit 12 of FIG. 1 above.

Embodiments within the present invention may also comprise means for emulating at least a portion of the instruction set. In FIG. 2, such means is illustrated, for example, by hardware emulation block 22. Hardware emulation block 22 is one way of implementing emulation unit 14 of FIG. 1. Hardware emulation block 22 is responsible for emulating at least a portion of the instructions in the instruction set. As described in greater detail below, caller parser processing block 20 will employ hardware emulation block 22 to emulate instructions that are not implemented directly in hardware. As illustrated in FIG. 2, hardware emulation block 22 may access underlying hardware 24. Such access may be required, for example, when execution of an instruction requires direct that certain data be stored in a particular hardware location.

Embodiments within the scope of this invention may also comprise means for parsing a subset of the instruction set. By way of example, and not limitation, in FIG. 2 such means for parsing is illustrated by hardware parser block 26. Hardware parser block 26 may comprise a combination of hardware and an appropriate driver in order to allow hardware parser 26 to parse instructions of instruction stream 28 and employ underlying hardware 24 to execute the parsed instructions. As illustrated in FIG. 2, hardware parser 26 also interfaces with calling parser block 20 in order to achieve the tight coupling between instruction execution units that is desired by the present invention.

The remainder of FIG. 2 illustrates the means and mechanisms by which the tight coupling between instruction execution units may be achieved. For example, embodiments within the scope of this invention may comprise means for causing a partial instruction execution unit to begin parsing and executing instructions in the instruction stream. In FIG. 2, such means is illustrated, for example, by execute block 30. Execute block 30 illustrates a message or block of information that may be passed from caller parser processing block 20 to hardware parser block 26 in order to cause hardware parser block 26 to start executing instructions of instruction stream 28. As described in greater detail below, execute block 30 may contain such information as the starting location of the instruction stream and various other control parameters that influence how hardware parser block 26 executes the instructions of instruction stream 28.

Embodiments within the scope of this invention may also comprise means for taking control of executing the instruction stream when a partial instruction unit encounters an unimplemented instruction. By way of example, in FIG. 2 such means is illustrated by instruction unknown block 32. As previously described, when a partial instruction execution unit encounters an instruction that is unimplemented, the instruction execution unit passes control back to a caller instruction execution unit. One goal of the present invention is to pass control between execution units in an orderly fashion so that instruction execution is tightly coupled between the multiple units. Thus, instruction unknown block 32 may pass any information needed for caller parser processing block 20 to take control of executing instructions in instruction stream 28. For example, instruction unknown block 32 may pass an indicator that an unknown instruction was encountered and the location in the instruction stream where the unknown instruction can be found. Other appropriate information may also be passed that influences how caller parser processing block 20 handles execution of the unknown instruction.

When caller parser processing block 20 decodes an instruction, the block decides what should be done to execute the instruction. For example, caller parser processing block 20 may use hardware emulation block 22 to emulate an instruction. In addition, caller parser processing block 20 may also use hardware parser block 26 to implement a portion of the instruction. For example, if the instruction was to clip a particular graphic object being drawn on the screen, and if hardware parser block 26 did not implement the clipping function, the instruction would be passed to caller parser processing block 20 via instruction unknown block 32. Caller parser processing block 20 may then employ hardware emulation block 22 to calculate where the object should be clipped. Once the limits of the object have been calculated by hardware emulation block 22, caller parser processing block 20 may create one or more instructions that allow hardware parser block 26 to draw the clipped image. Thus, caller parser processing block 20 may employ not only hardware emulation unit 22 but also hardware parser block 26 or another partial instruction execution unit to execute a particular instruction.

It is, therefore, desirable to allow caller parser processing 20 to pass instructions to hardware emulation block 22 and hardware parser block 26. It is also desirable to allow caller parser processing block 20 to receive from hardware emulation block 22 and hardware parser block 26 the results of executing or emulating the designated instructions. Embodiments within the scope of this invention may therefore comprise means for transferring an instruction to be executed. By way of example, such means is illustrated in FIG. 2 by instruction block 34. Instruction block 34 represents the capability of caller parser processing block 20 to pass one or more instructions to either a partial instruction execution unit or to an emulation unit and have the one or more instructions executed or emulated. It is largely unimportant how instruction block 34 is created or formatted. In fact, the instruction block sent to a partial instruction execution unit such as hardware parser block 26 may be completely different than the type of instruction block sent to hardware emulation unit 22. All that is required is that the appropriate block receive sufficient information to execute or emulate one or more desired instructions.

When instructions have been executed by hardware parser block 26 or hardware emulation block 22 under the direction of caller parser processing block 20, it may be desirable to return information to caller parser processing block 20 regarding the result or status after execution of the instruction. Embodiments within the scope of this invention may therefore comprise means for returning information to caller parser processing block 20 after execution of one or more designated instructions. In FIG. 2, for example, such means is illustrated by results block 36. These blocks illustrate the capability of hardware parser block 26 or hardware emulation block 22 to return information to caller parser processing block 20. Such information may indicate the success or failure of the execution of the instruction, the result of a calculation that was performed, or any other type of information that should be returned to caller parser processing block 20. As described below, the format of results block 36, at least when returned by hardware parser 26, may be the same as instruction unknown block 32. Such details, however, are largely design choices and will depend upon the instruction set implemented and the specific application for the invention.

In order to present the invention in a more concrete context, a specific example of a graphics application will be presented. It should be understood that this example is simply illustrative of one particular application for the present invention and should not, therefore, be considered to be limiting of its scope. In this example, a system is configured with a graphics subsystem designed to render and display three-dimensional graphic objects. The graphic system and the process of rendering and displaying graphical objects may be like that disclosed in copending U.S. patent application Ser. No. 08/741,474, entitled SYSTEM AND METHOD FOR FAST RENDERING OF A THREE-DIMENSIONAL GRAPHICAL OBJECT, filed on the same date as the present invention (hereinafter the "3D Graphics Application") incorporated herein by reference.

In this system, graphic objects are rendered by creating an encapsulated execute buffer. The execute buffer contains a vertex pool comprised of a plurality of vertices that defined a three-dimensional object. Encapsulated with the vertex pool is an instruction stream that contains instructions drawn from an instruction set that can be used to program the graphics subsystem to render and display the three-dimensional graphic object from the data contained in the vertex pool. The encapsulated execute buffer thus contains data and instructions that cause the graphics subsystem to render and display an object.

As disclosed in the copending 3D Graphic Application, the process of rendering and displaying a three-dimensional graphic object may comprise three broad classes of functions, each implemented by a separate module. The first broad class is transformation functions which cause vertices to be transformed from one coordinate frame to another, rotated, scaled, or otherwise manipulated in order to arrive at the proper data to be displayed. The lighting functions light the vertices according to some lighting scheme and influence such factors as the color, brightness, and so forth of the object displayed. The third broad classification of instructions is the rasterization functions which take transformed and lit vertices and draws polygons such as triangles in order to render the object. The transformation functions are controlled by transform instructions directed to a transform module. The lighting functions are controlled by lighting instructions directed to a lighting module. The rasterization functions are controlled by rasterization instructions directed to a rasterization module.

Figure 3:
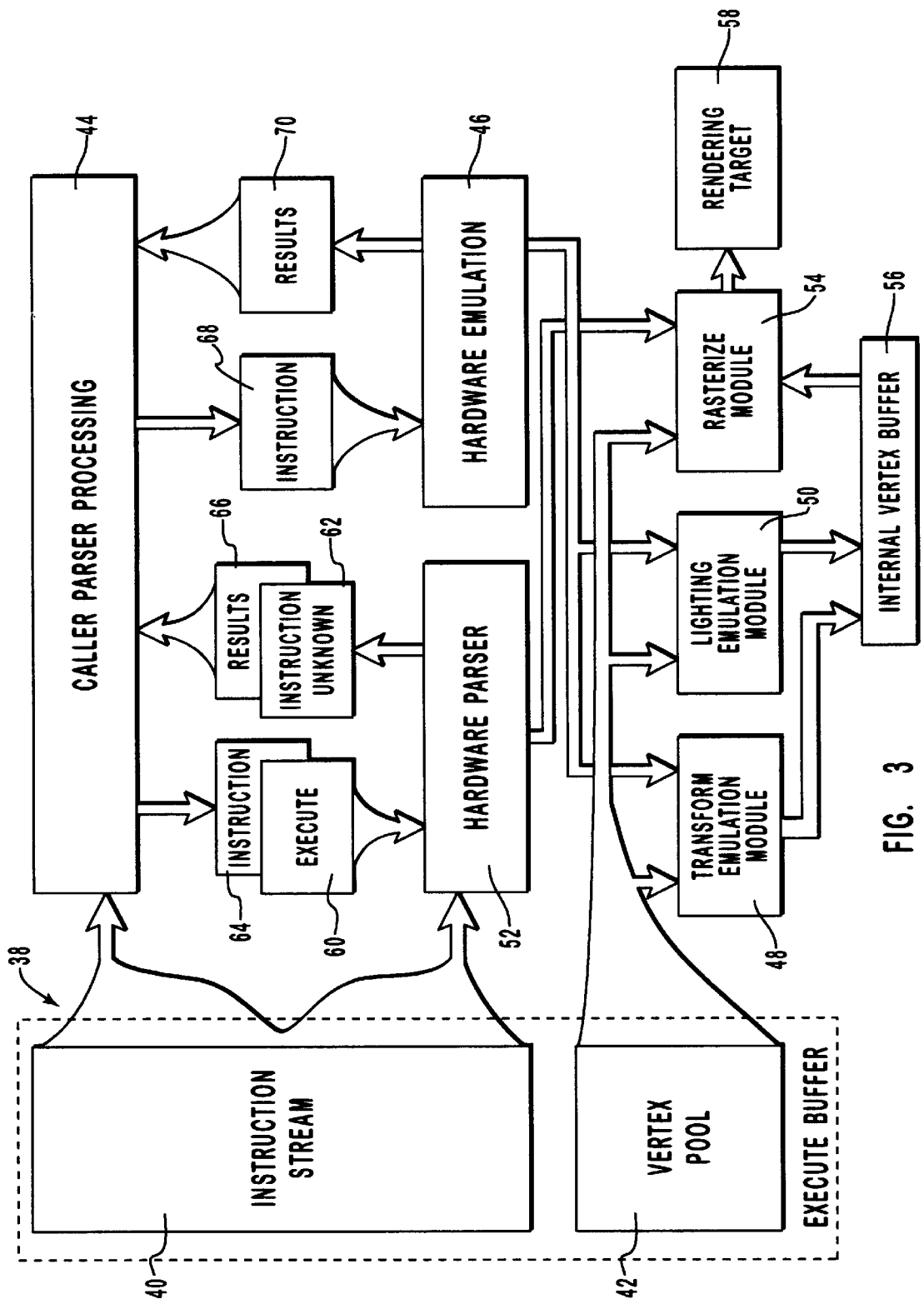
FIG. 3 is a flow diagram of an embodiment of the present invention used for graphics processing.

Depending on the type of hardware available in the system, the hardware may implement one or more of the transformation module, the lighting module, and the rasterization module. It would be extremely desirable to take advantage of any hardware that was available on the system while still allowing all instructions of the instruction set to be executed if a system lacks a hardware implementation of one or more of the modules. The present invention provides an ideal way to achieve this goal. The available hardware can be used as one or more partial instruction execution units and software may be used to implement a caller instruction execution unit that will emulate any of the instructions that are not directly implemented by the hardware. FIG. 3 presents an example embodiment where the hardware implements only the rasterization module. This leaves the transform module and lighting module to be emulated by the caller instruction execution unit.

As previously described, in the three-dimensional graphic system disclosed in the copending 3D Graphics Application information that is processed by the graphics subsystem is contained within an encapsulated execute buffer, shown generally in FIG. 3 as execute buffer 38. As illustrated in FIG. 3, execute buffer 38 is comprised of instruction stream 40 and vertex pool 42. Instruction stream 40 contains instructions that direct the graphics subsystem to render the vertices contained in vertex pool 42. In one embodiment, the instruction set contains at least the following instructions:

| INSTRUCTION | RELEVANT MODULE |
| --- | --- |
| POINT | Rasterization |
| LINE | Rasterization |
| TRIANGLE | Rasterization |
| MATRIXLOAD | Transform |
| MATRIXMULTIPLY | Transform |
| STATETRANSFORM | Transform |
| STATELIGHT | Lighting |
| STATERENDER | Rasterization |
| PROCESSVERTICES | Transform/Lighting |
| TEXTURELOAD | Rasterization |
| EXIT | All |
| BRANCHFORWARD | All |
| SPAN | Rasterization |
| SETSTATUS | All |

The purpose of most of these instructions is evident from the title of the instruction. For example, POINT directs the rasterization module to draw a point from one or more vertices. LINE and TRIANGLE are similar instructions directing the rasterization module to draw a line or a triangle using designated vertices. The MATRIX functions perform operations on various transformation matrices used by the transform module. The STATE functions set the state of the appropriate module. The PROCESSVERTICES function causes vertices in the vertex pool to be transformed and lit by the transform and lighting module. The TEXTURELOAD function loads a texture to be used by the rasterization module. The EXIT function signals the end of the instruction stream. The BRANCHFORWARD function indicates a branch that skips forward in the instruction stream to the designated location. The SPAN function is used by the rasterization module to draw spans, and the SETSTATUS function sets the status of the various modules. More information regarding the instructions in this instruction set can be found in Direct X help file distributed with the Direct X Software Development Kit, available from Microsoft, which is incorporated herein by reference.

In the embodiment illustrated in FIG. 3, the instructions directed to the rasterization module will be able to be executed directly by the hardware. The instructions directed to the transform or lighting module will need to be emulated since those modules are not implemented in hardware in the embodiment illustrated in FIG. 3.

In FIG. 3, caller parser processing block 44 is an example of the previously described means for parsing the complete instruction set. In the embodiment illustrated in FIG. 3, caller parser processing block 44 is implemented in software running on the CPU of the host computer. Also implemented in software, running on the CPU of the computer system is hardware emulation block 46. Hardware emulation block 46 represents an example of the previously described means for emulating at least a portion of the instruction set. It is imported in this embodiment that hardware emulation block 46 be able to emulate at least those instructions not implemented by the hardware. Thus, hardware emulation block 46 emulates the transform and lighting module. This emulation is illustrated in FIG. 3 by transform emulation module 48 and lighting emulation module 50. Although transform emulation module 48 and lighting emulation module 48 are implemented as part of the hardware emulation block 46, they are shown separate in FIG. 3 simply to emphasize the overall architecture of the system and to illustrate those modules that are emulated and those modules that are implemented in hardware.

The embodiment illustrated in FIG. 3 also comprises hardware parser block 52. Hardware parser block 52 illustrates another example of the previously described means for parsing a subset of the instruction set. Hardware parser block 52 may comprise a combination of actual hardware and a driver layer used to interface with caller parser processing block 44 and, possibly, to retrieve instructions from instruction stream 40 As is common with such hardware drivers, the hardware driver layer may be mapped into the address space of caller parser processing block 44 in order to allow caller parser processing block 44 to access the driver of hardware parser block 52. As explained in greater detail below, hardware parser block 52 parses instructions relating to the rasterization module and causes rasterize module 54 to execute the instructions. Rasterize module 54 is a hardware module adapted for performing the designated rasterization functions.

The embodiment illustrated in FIG. 3 also comprises internal vertex buffer 56 and rendering target 58. Internal vertex buffer 56 is a buffer internal to the hardware that is adapted for receiving transformed and lit vertices. As explained in greater detail in the copending 3D Graphics Application, the transform and lighting module take vertices from vertex pool 42 and transform and light them and place them into internal vertex buffer 56. This embodiment illustrates an example where hardware emulation block 46 may need to access underlying hardware to store the results of an emulated function. Rendering target 58 is any appropriate target that can receive the output of rasterize module 54. Thus, rendering target 58 may be an actual display device, or may be an intermediate structure or memory where data that is ready to be displayed can be placed.

As detailed below, caller parser processing block 44 will cause hardware parser block 52 to begin parsing and executing instructions of instruction stream 40. In order to achieve this, caller parser processing block 44 must direct hardware parser block 52 to begin executing the instruction stream and pass sufficient information to hardware parser block 52 that allows hardware parser block 52 to find and execute instruction stream 40. In FIG. 3, this capability is illustrated by execute block 60. This block represents the data that is passed from caller parser processing block 44 to hardware parser block 52 when hardware parser block 52 is to execute instruction stream 40.

Hardware parser block 52 will return control to caller parser processing block 44 when an unknown instruction is encountered. In order to pass control from hardware parser block 52 to caller parser processing block 44, various pieces of information must be passed to caller parser processing block 44. In FIG. 3, this information is illustrated by instruction unknown block 62. As described in greater detail below, such information may contain the location of the unimplemented instruction in instruction stream 40.

Caller parser processing block 44 also has the capability of passing one or more instructions to hardware parser block 52 and having hardware parser block 52 return the results of those instructions. In FIG. 3, instructions are passed to hardware parser block 52 via instruction block 64 and results are returned via result block 66. Any type or format of structures may be used to pass appropriate information between caller parser processing block 44 and hardware parser block 52. In one embodiment, execute block 60, instruction unknown block 62, instruction block 64, and results block 66 are all implemented using a common data structure. This common data structure contains at least the following information:

| Device Context | Instruction Offset | Flags | Execute Buffer Format | Execute Buffer | Local Vertex Buffer | Instruction | Result |
| --- | --- | --- | --- | --- | --- | --- | --- |

In this structure, the device context field is the device context of the client using the graphics subsystem. The instruction offset is the offset field in the instruction stream where execution should begin. Flags is a field that indicates whether instruction execution should begin at the indicated offset or whether the instruction included in the instruction field should be executed instead. The execute buffer format field is a pointer to a structure that indicates the format of the execute buffer and includes such parameters as the size of the execute buffer, the location in the execute buffer where the vertex data begins, the number of vertices in the vertex pool, the location in the buffer where the instructions begin, and the length of the instruction section of the execute buffer. Execute buffer field is a pointer to the execute buffer itself. The local vertex buffer field is a pointer to the internal vertex buffer of the hardware, such as internal vertex buffer 56 of FIG. 3. The instruction field may contain an instruction that is to be executed by hardware parser block 52. The result field contains the results of the execution and may contain such information as normal execution complete or an indicator that the instruction is unimplemented. Those of skill in the art will realize that using a structure containing these fields is sufficient to allow the functions of execute block 60, instruction unknown block 62, instruction block 64, and results block 66 to be implemented.

In communicating with hardware emulation block 46, caller parser processing block 44 may use instruction block 68 and results block 70. In one embodiment, these blocks are not equivalent to instruction block 64 and results block 66. In this embodiment, these blocks simply represent functions that are called by caller parser processing block 44 to execute instructions using transform emulation module 48 and lighting emulation module 50. Results block 70 represents any results that are returned to caller parser processing block 44 from the function calls.

Figure 4:
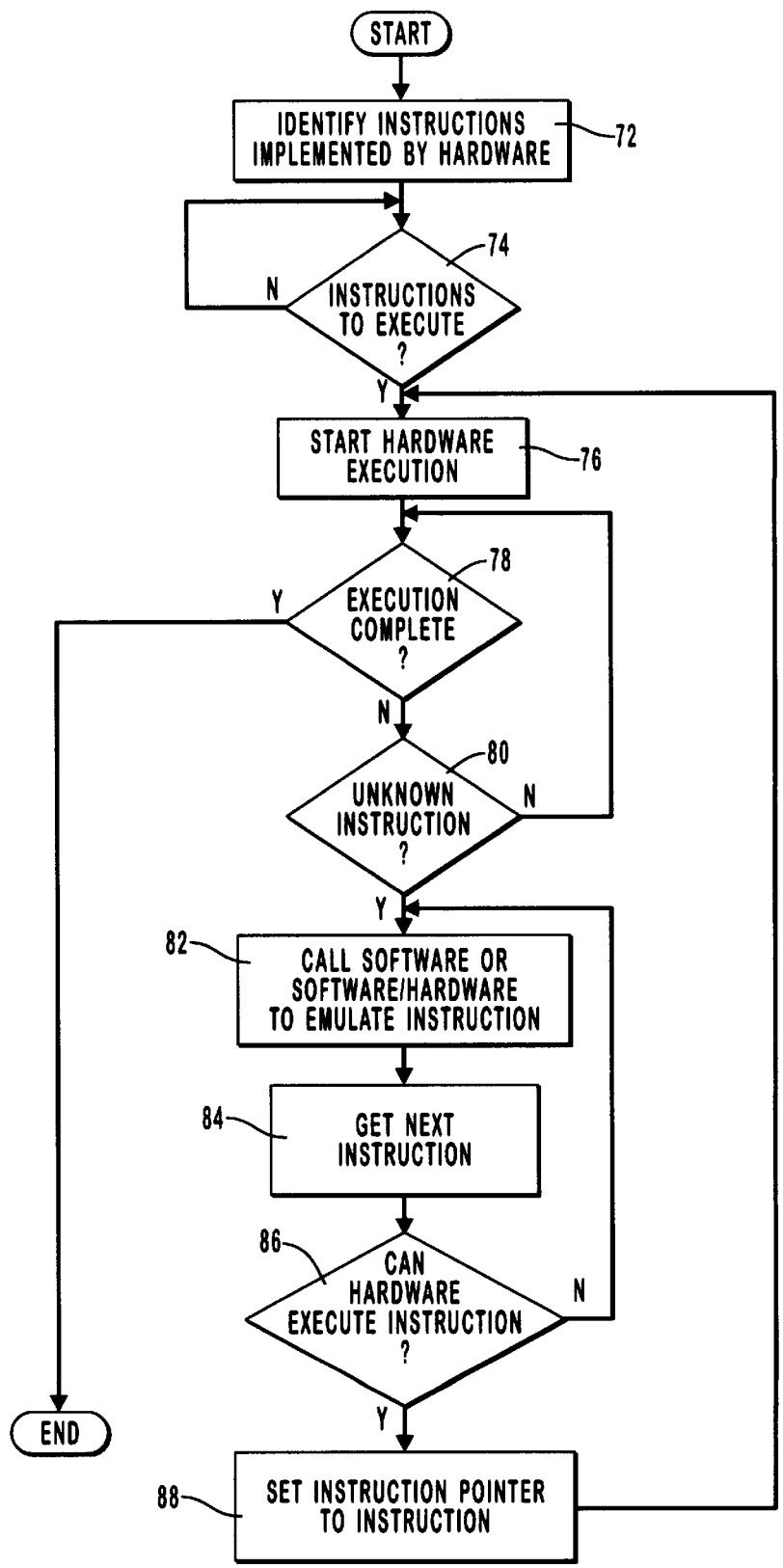
FIG. 4 is a flow diagram of the caller parser processing block of FIG. 3.
Figure 5:
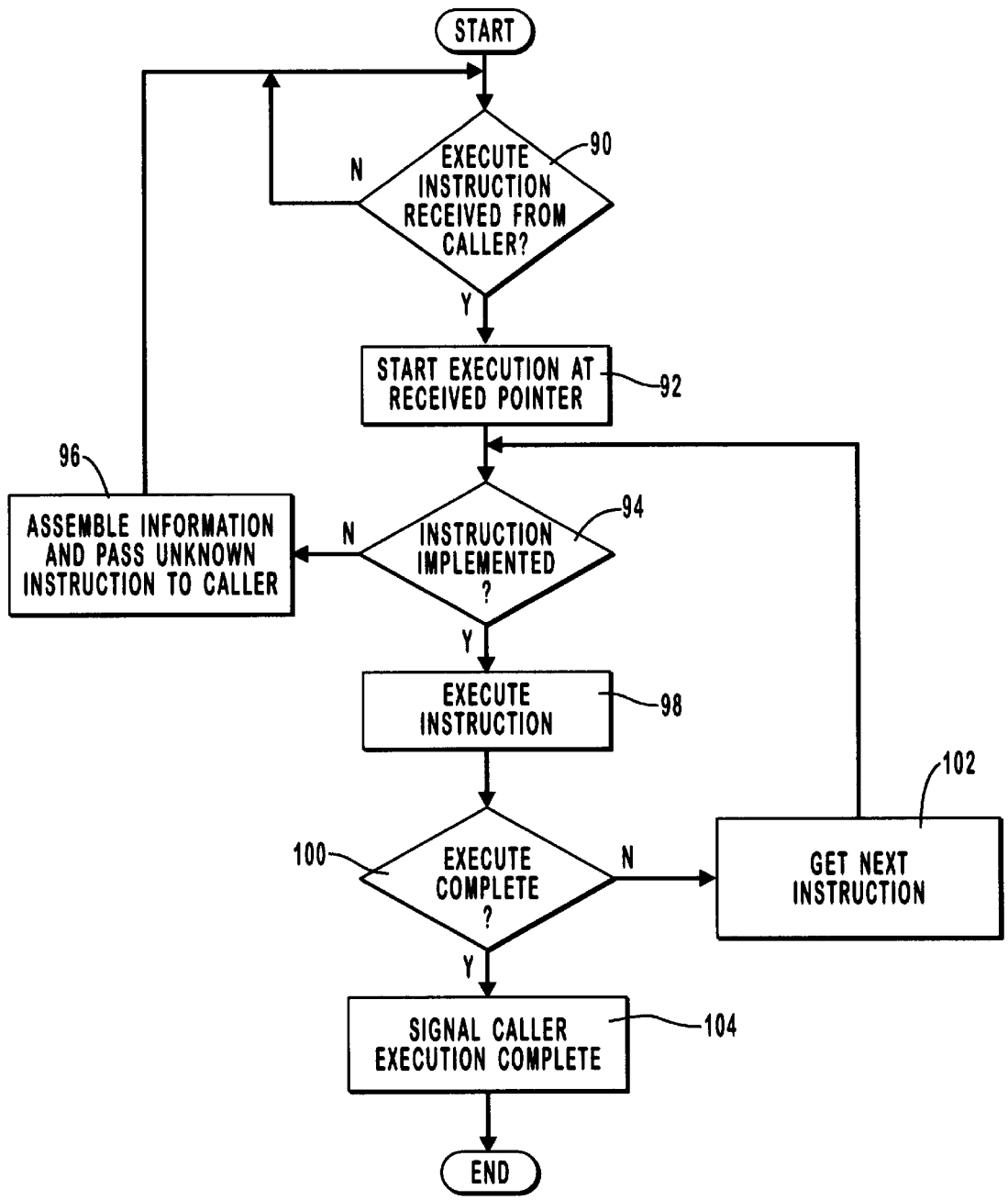
FIG. 5 is a flow diagram of the hardware parser block of FIG. 3.
Figure 6:
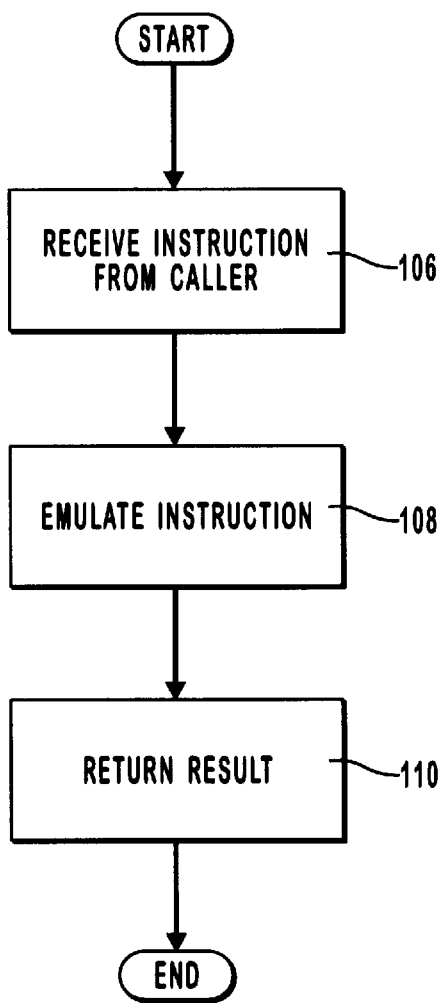
FIG. 6 is a flow diagram of the hardware emulation block of FIG. 3.

Referring now to FIGS. 4 through 6, the details of one embodiment of caller parser processing block 44, one embodiment of hardware emulation block 46, and one embodiment of hardware parser 52 are presented in order to illustrate how the embodiment of FIG. 3 works. A specific example using a hypothetical execute buffer is then given that employs the embodiment of FIG. 3 to illustrate how the processing in FIGS. 4 through 6 work together to execute an instruction stream such a instruction stream 40.

Referring first to FIG. 4, the processing of one embodiment of caller parser processing block 44 is presented. In FIG. 4, execution begins with step 72 which identifies the instructions implemented by hardware parser 52. Although this step may not be strictly required, it is preferred that caller parser processing block 44 be able to identify which instructions of the instruction set are implemented by the hardware. Thus, in general, it is desirable for embodiments within the scope of this invention to have the caller instruction execution unit, such as caller instruction execution unit 10 of FIG. 1, identify which instructions of the instruction set are implemented by each partial instruction execution unit, such as partial instruction execution unit 16 of FIG. 1. As described briefly above, and as illustrated in greater detail below, this allows caller parser processing block 44 to implement an optimization that minimizes the number of transitions between hardware parser 52 and caller parser processing block 44. This also allows caller parser process block 44 to adapt if hardware parser block 52 changes the instructions it implements.

Step 72 may be accomplished by having caller parser processing block 44 query hardware parser block 52 and having hardware parser block 52 return information to caller parser processing block 44 regarding the instructions that it implements. In the alternative, when the hardware is installed into the system, a data store may be created that contains information regarding the instructions implemented by the hardware. Caller parser processing block 44 may then retrieve the information from the data store. As yet another example, caller parser processing block 44 may test each instruction in the instruction set by passing the instruction to hardware parser block 52 and determining whether the instruction is executed or whether an unimplemented instruction result is returned. Any other method may also be used and all that is important is that caller parser processing block 44 be able to identify those instructions implemented by hardware parser 52. All these mechanisms are examples of a means for determining which portion of the instruction set is implemented by a partial instruction execution unit.

In the embodiment illustrated in FIG. 3, the instruction set breaks down into three general categories of instructions, each category operating on a different module. Thus, it would be possible to require the hardware to implement all instructions of a particular module if the hardware implements the module. For example, in the embodiment illustrated in FIG. 3 the hardware implements rasterize module 54. Thus, it is reasonable to expect that the hardware implements all instructions that relate to rasterize module 54. In such an embodiment, it would be easy for caller parser processing block 44 to identify which modules were implemented by the hardware in order to identify which instructions are implemented by the hardware. Such an approach has an additional benefit. If a caller instruction execution unit, such as the caller execution unit implemented in FIG. 3 by caller parser processing block 44 and hardware emulation block 46, contains means to emulate an entire instruction set, then it is important allow the caller instruction execution unit to identify which instructions should be emulated and which instructions should be executed directly by the hardware. By requiring the hardware to implement either all or none of a particular module, then hardware emulation block 46 may load only those unimplemented modules. Such an approach may allow the size of emulation block 46 to be minimized if memory or other resources are scarce.

After step 72, execution passes to decision block 74. As indicated in decision block 74, caller parser processing block 44 will not do any further processing until an instruction stream is available to be executed. In the embodiment illustrated in FIG. 3, an instruction stream is available to be executed when an execute buffer is passed to the embodiment illustrated in FIG. 3. An execute buffer may be passed to the embodiment in FIG. 3 by a client process that creates the execute buffer in memory and then calls a function to cause caller parser processing block 44 to take control of executing the instruction stream of the execute buffer.

When instructions are available for execution, step 76 is executed. In step 76, hardware execution of the instruction stream is started. As previously explained, this may be accomplished by passing a structure, such as that illustrated above, to hardware parser block 52 through a call in a driver associated with hardware parser block 52. This will allow hardware parser block 52 to begin parsing and executing the instructions of instruction stream 40.

As indicated by decision block 78 and decision block 80, after control has passed to hardware parser block 52, caller parser processing block 44 will wait for either hardware parser block 52 to signal that execution of the instruction stream is complete or that hardware parser block 52 has encountered an unknown instruction. If hardware parser block 52 signals that execution is complete, then decision block 78 illustrates that the process is at an end. More properly, however, execution would probably return to decision block 74 to wait for another execution buffer to process.

If decision block 80 identifies that hardware parser 52 has encountered an unknown instruction, then step 82 indicates that caller parser processing block 44 will call either hardware emulation block 46 or a combination of hardware emulation block 46 and hardware parser block 52 in order to emulate the unimplemented instruction. In order to utilize hardware emulation block 46 or hardware parser block 52 to emulate a particular instruction, caller parser processing block 44 would either call functions in hardware emulation block 46 or may pass instructions through instruction block 64 to hardware parser block 52. These options have been described previously.

As briefly described above, once control has passed to caller parser processing block 44 and an unimplemented instruction has been emulated by caller parser processing block 44, then the next step is to return control to hardware parser block 52 so that hardware parser block 52 can continue to parse and execute instruction stream 40. However, in order to minimize the number of transitions between caller parser processing block 44 and hardware parser block 52, caller parser processing block 44 may examine the next instruction in the instruction stream and determine whether hardware parser block 52 implements the next instruction. If the instruction is implemented, then control may be passed to hardware parser block 52 without fear that the block will immediately return control to caller parser processing block 44. However, if the instruction is unimplemented by hardware parser block 52, then the instruction may be directly emulated by caller parser processing block 44 before control is returned to hardware parser block 52. This optimization is illustrated in step 84 and decision block 86. After one instruciton is emulated in step 82, step 84 retrieves the next instruciton in the instruction stream. Decision block 86 then decides whether the instruction is implemented by hardware parser 52. If so, then step 88 sets the instruction pointer in the structure previously described to the next instruction and returns control to step 76 which passes control of execution to hardware parser block 52. If, however, the instruction is not implemented by hardware parser block 52, then decision block 86 returns control to step 82 where the instruction is emulated.

Turning now to FIG. 5, one embodiment of the processing that occurs in hardware parser block 52 is presented. As illustrated in FIG. 5, execution begins with decision block 90 which waits either until caller parser processing block 44 has indicated that hardware parser block 52 should begin parsing and executing instruction stream 40 or until caller parser processing block 44 passes one or more instructions to hardware parser block 52 for execution. As previously described, caller parser processing block 44 begins execution of the instruction stream in step 76 of FIG. 4 and caller parser processing block may pass instructions to hardware parser block 52 during step 82 of FIG. 4. When a signal is received from caller parser processing block 44 that hardware parser block 52 should begin executing one or more instructions, then execution passes to step 92 where hardware parser block 52 begins executing the instructions by parsing the first instruction. Execution then proceeds to decision block 94.

Decision block 94 determines whether the instruction is implemented in the hardware. If the instruction is not implemented in the hardware, then execution passes to step 96 where the appropriate information is assembled and returned to caller parser processing block 44 in order to pass execution from hardware parser block 52 to caller parser processing block 44. As described previously, this may be achieved by use of the structure described above. Specifically, the instruction offset field in the structure should be set to the unimplemented instruction, the result field should be set to indicate that an unimplemented instruction was encountered, and the structure passed to caller parser processing block 44. If the instruction is implemented by the hardware, then step 98 indicates that the instruction should be executed. This is accomplished by hardware parser block 52 generating appropriate control signals to cause rasterize module 54 to implement the desired instruction After step 98 execution proceeds to decision block 100 which tests for the end of the instruction stream. In the instruction set presented above, the end of the instruction stream is signaled by an EXIT instruction. Thus, in such an instruction set the end of the instruction stream would be determined by step 98 identifying the current instruction as the EXIT instruction. If the end of the instruction has not been reached, then execution proceeds to step 102 where the next instruction is retrieved. Execution then proceeds back to decision block 94.

If, however, decision block 100 detects that the end of the instruction stream has been reached, then execution proceeds to step 104 where information is passed to caller parser processing block 44 to indicate that the instruction stream has been completely executed. Using the structure previously described, this may be achieved by setting the result field to a value that indicates to the caller parser processing block 44 that the instruction stream has been completely executed. Execution then terminates, or rather, execution proceeds back to the start in order to await further instructions from caller parser processing block 44.

Turning now to FIG. 6, one embodiment of hardware emulation block 46 is presented. As previously described, caller parser processing block 44 may call functions in hardware emulation block 46 at step 82 of FIG. 4 in order to achieve emulation of instructions that are unimplemented by hardware parser block 52. In FIG. 6, the function call process is illustrated by step 106. As previously described, in general, if caller parser processing block 44 is implemented in software, then instruction block 68 and result block 70 of FIG. 3 are nothing more than a function call into hardware emulation block 46 and the results that are returned from the function call. Thus, step 106 of FIG. 6 represents the function call that is made by caller parser processing block 44 to hardware emulation block 46.

When the function call is made, the next step is to emulate the instruction by executing the code of the function as illustrated in step 108 of FIG. 6. After the function has been performed, a result may be returned to caller parser processing block 44 as indicated in step 110. Obviously not all function calls will require a result to be returned to caller parser processing block 44. However, step 110 indicates that such an option is available in appropriate circumstances.

In order to more fully illustrate the operation of the embodiment presented in FIG. 3, an example using a simplified execute buffer will be presented. In this example, assume that a simple execute buffer has been assembled that contains a vertex pool of seven vertices and an instruction stream containing six instructions as follows:

```
Vertex 1
Vertex 2
.
.
.
Vertex 7
STATETRANSFORM
STATELIGHT
STATERENDER
PROCESSVERTICES
TRIANGLE
EXIT
```

When caller parser processing block 44 receives the execute buffer illustrated above, execution will proceed to step 76 of FIG. 4 where appropriate information will be passed to hardware parser block 52 to allow hardware parser processing block 52 to begin executing the instruction stream. If the structure presented previously is used to communicate between caller parser processing block 44 and hardware parser block 52, then the instruction offset field of the structure will be set to zero, the flags field will be set to a normal execute mode, the execute buffer format field will describe the execute buffer presented above, the execute buffer field will contain a pointer to the execute buffer above, the local vertex buffer field will contain a pointer to internal vertex buffer 56, the instruction field and the result field will be undefined.

At this point, hardware parser block 52 will assume control of executing the instruction stream. In FIG. 5, execution will thus proceed through decision block 90 to step 92. The pointer will be at the STATETRANSFORM instruction of the instruction stream. This instruction will be parsed and execution will proceed to decision block 94. An examination of the instruction set presented previously indicates that the STATETRANSFORM instruction relates to the transform module. The hardware of the embodiment of FIG. 3 only implements the rasterize module. The hardware would not implement this instruction in this example.

Execution will then proceed to step 96 of FIG. 5 where the appropriate information is assembled and passed back to caller parser processing block 44. If the structure previously described is used to pass such information, then the instruction offset field of the structure is set to the first instruction, and the result field is set to an instruction unhandled code that allows caller parser processing block 44 to identify that control is being returned because an unimplemented instruction was encountered. The remainder of the fields of the structure are unchanged. Returning to FIG. 4, caller parser processing block 44 will identify that control is being returned due to an unknown instruction through decision block 80. Execution will proceed to step 82. In this instance, caller parser processing block 44 would likely make a function call into hardware emulation block 46 to emulate the STATETRANSFORM instruction.

At this point, execution will then pass to hardware emulation block 46 and the steps of FIG. 6 are executed. In other words, in step 106 the function call is made. Step 108 executes the code of the function, and step 110 returns any result from the function. Control then passes back to step 84 of FIG. 4. In this step, caller parser processing block 44 examines the next instruction, which is a STATELIGHT instruction. Decision block 86 then determines that this instruction is not implemented by the hardware and execution proceeds back to step 82. As before, a function call would be made to hardware emulation block 46 to implement the STATELIGHT instruction. After the call to hardware emulation block 46, step 84 examines the next instruction, which is a STATERENDER instruction. This time, decision block 86 indicates that the instruction is implemented by the hardware. Step 86 then sets the instruction offset pointer field of the structure to point to the STATERENDER instruction and execution process to step 76 where control is passed back to hardware parser block 52.

As control is received by hardware parser block 52, execution proceeds through step 90 of FIG. 5 to step 92. The instruction is parsed and decision block 94 indicates that the STATERENDER instruction is implemented by the hardware. Step 98 then executes the instruction, which sets the state of the rendering module. Step 100 then indicates that the execution stream had not yet been completely executed. The next instruction is then retrieved by step 102 (the PROCESSVERTICES instruction) and decision block 194 indicates the instruction is not implemented by the hardware. The PROCESSVERTICES instruction causes the vertices in the vertex pool to be transformed and lit and placed into the internal vertex buffer. Since decision block 94 indicates that this instruction is not implemented by the hardware, control is then be passed back to caller parser processing block 44 by step 96 as previously described.

Decision block 80 of FIG. 4 then recognizes that control is being returned because an unimplemented instruction was encountered by the hardware. Execution then proceeds to step 82 of FIG. 4 which calls hardware emulation block 46 to implement the instruction. Hardware emulation block 46 utilizes transform emulation module 48 to transform the vertices from the vertex pool and place them into internal vertex buffer 56. Similarly, lighting emulation module 50 is used to light the vertices of the vertex pool and place them into internal vertex buffer 56. After the PROCESSVERTICES instruction is emulated by step 82 of FIG. 4, step 84 and decision block 86 examines the next instruction. Referring back to the execute buffer of this example reveals that the next instruction is the TRIANGLE instruction. An examination of the instruction set reveals that the TRIANGLE instruction is implemented by the rasterize module. The TRIANGLE instruction directs that one or more triangles be drawn by connecting vertices in the vertex pool. Because the instruction is implemented by the hardware, decision block 86 passes execution to step 88 which sets the instruction offset field of the structure to point to the TRIANGLE instruction. Execution then proceeds back to step 76 of FIG. 4 where execution is passed to hardware parser 56.

Returning to FIG. 5, execution proceeds through decision block 94 to step 98 where the TRIANGLE instruction is executed by generating appropriate control signal to cause rastorized module 54 to draw triangles by connecting vertices of the vertex pool. Decision block 100 then determines that the instruction stream has not yet been fully executed so execution proceeds through step 102 back to decision block 94. Step 102 and decision block 94 then retrieves and parses the EXIT instruction. The EXIT instruction indicates the end of the instruction stream and is implemented by the rastorize module. Execution then proceeds to step 98 and decision block 100 where it is determined that the instruction stream is completely executed. Step 104 then signals caller parser processing block 44 that execution of the instruction stream is complete. This is performed by setting the result field of the structure to a normal completion code. Control is then passed to caller parser processing block 44. Decision block 78 of FIG. 4 identifies that control is being returned because the instruction stream had been completely executed. At this point all processing for the execute buffer would be complete.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system for generating high speed graphics using an instruction stream having a plurality of instructions, said computer system having a hardware parser for parsing a subset of said instructions so that at least some instructions are executable by high speed graphics hardware, and the computer system having a caller parser for parsing all instructions so that the remainder of said instructions are executable by a hardware emulation unit, a method for optimizing execution speed of the instructions by the allocation of the instructions between the high speed graphics hardware and the hardware emulation unit, the method comprising the steps of:

using the hardware parser to parse the instruction stream and executing thereafter the parsed instructions with said high speed graphics hardware until the hardware parser encounters an instruction that is not understood by the hardware parser;

using the caller parser to parse the instruction that is not understood by the hardware parser, and executing thereafter the parsed instruction at least partially with the hardware emulation unit;

using the caller parser to parse the next instruction in the instruction stream and if the next instruction is understandable by the hardware parser, passing control of the instruction stream back to the hardware parser, and if the next instruction is not understandable by the hardware parser, executing the next instruction at least partially with the hardware emulation unit; and repeating each of the above steps until the instruction stream is completely parsed and executed.

2. A method optimizing execution speed of an instruction stream as recited in claim 1 further comprising the step of said caller parser determining which instructions are implemented by said high speed graphics hardware prior to beginning execution of the instructions so that said caller parser can identify which instructions in said instruction stream can be executed by said high speed graphics hardware.

3. A method optimizing execution speed of an instruction stream as recited in claim 1 wherein said caller parser is implemented using executable code means for causing a CPU of the computer system to perform the functions of said caller parser.

4. A method optimizing execution speed of an instruction stream as recited in claim 1 wherein said instruction stream comes from an encapsulated execute buffer comprised of said instruction stream and a plurality of vertices that together form a vertex pool, the instructions of said instruction stream rendering the vertices of said vertex pool.

5. A method optimizing execution speed of an instruction stream as recited in claim 1 wherein said caller parser uses said high speed graphics to implement a portion of an instruction that is unimplemented by said hardware parser by first translating the unimplemented instruction into a plurality of other instructions, at least one of which is implemented by the hardware parser, and then passing at least one instruction implemented by the hardware parser to the hardware parser for execution by the high speed graphics and then emulating the remainder of said plurality of other instructions.

6. A method optimizing execution speed of an instruction stream as recited in claim 1 wherein when said hardware parser encounters an unimplemented instruction, said hardware parser passes a pointer to the unimplemented instruction to said caller parser.

7. A method optimizing execution speed of an instruction stream as recited in claim 1 wherein when said caller parser encounters an instruction that is implemented by said hardware parser, said caller parser passes a pointer to the implemented instruction to said hardware parser.

8. A method optimizing execution speed of an instruction stream as recited in claim 1 wherein when said hardware parser encounters an unimplemented instruction and passes control to said caller parser, said caller parser parses said unimplemented instruction to determine if said unimplemented instruction should have been executed by the high speed graphics hardware and wherein said caller parser raises an error if said unimplemented instruction should have been executed by the high speed graphics hardware.

9. In a computer system for generating high speed graphics using an instruction stream having a plurality of instructions, said computer system having a hardware parser for parsing a subset of said instructions so that at least some instructions are executable by high speed graphics hardware, and the computer system having a caller parser for parsing all instructions so that the remainder of said instructions are executable by a hardware emulation unit, a method of optimizing execution speed of the instructions by the allocation of the instructions between the high speed graphics hardware and the hardware emulation unit, the method comprising the steps of:

prior to execution of the instruction stream, the caller parser determining the subset of instructions implemented by said hardware parser so that said caller parser can identify which of said instructions in said instruction stream can be executed by said high speed graphics hardware;

said hardware parser parsing the instruction stream and thereafter executing said instruction stream using the high speed graphics hardware until either the instruction stream is completely executed or until an instruction that is not implemented is encountered;

if said hardware parser encounters an unimplemented instruction in said instruction stream then performing at least the steps of:

said hardware parser passing control to said caller parser so that the unimplemented instruction can be executed under the direction of the caller parser; and said caller parser first parsing the unimplemented instruction and thereafter executing said unimplemented instruction at least in part by the hardware emulation unit; and prior to returning control to said hardware parser, said caller parser parsing the next instruction to see if the next instruction is implemented by said hardware parser.

10. A method optimizing execution speed of an instruction stream as recited in claim 9 wherein control is returned to said hardware parser after said caller parser parses and thereafter causes said unimplemented instruction to be executed at least in part by the hardware emulation unit.

11. A method of optimizing execution speed of an instruction stream as recited in claim 9 wherein if said caller parser determines that the next instruction is not implemented by said hardware parser, said caller parser does not return control to said hardware parser and said caller parser causes the next instruction to be executed, at least in part, by the hardware emulation unit.

12. A method optimizing execution speed of an instruction stream as recited in claim 11 wherein said caller parser causes said unimplemented instruction to be executed by first translating the unimplemented instruction into a plurality of other instructions, at least one of which is implemented by the high speed graphics hardware and then by using said the high speed graphics hardware to execute said at least one implemented instruction.

13. A method optimizing execution speed of an instruction stream as recited in claim 11 wherein said hardware emulation unit is implemented using executable code means for causing a CPU of the computer system to emulate execution of graphics instructions.

14. A method optimizing execution speed of an instruction stream as recited in claim 13 wherein said instruction stream comes from an encapsulated execute buffer comprised of said instruction stream and a plurality of vertices that together form a vertex pool, the instructions of said instruction stream rendering the vertices of said vertex pool.

15. In a computer system for generating high speed graphics using an instruction stream having a plurality of instructions, said computer system comprising at least one specialized hardware processing unit adapted to parse and execute at least a subset of the instructions, and a central processing unit (CPU), having a caller parser at least partially implemented in software for parsing all instructions so that the remainder of the instructions are executable by a hardware emulation unit executing on the CPU a method for optimizing execution speed of the instructions by the allocation of the instructions between the at least one specialized processing unit and the CPU comprising the steps of:

said CPU causing said specialized hardware processing unit to begin parsing and executing said instruction stream;

said specialized hardware processing unit parsing and executing said instruction stream until said instruction stream is completely executed or until said specialized hardware processing unit encounters an instruction not implemented by said specialized hardware processing unit;

if said specialized hardware processing unit encounters an unimplemented instruction, then performing at least the steps of:

said specialized hardware processing unit passing said unimplemented instruction back to said CPU for processing;

said CPU emulating said unimplemented instruction and said CPU then examining the next instruction prior to passing control back to said specialized hardware processing unit and if the next instruction is not implemented by said specialized hardware processing unit, then emulating the next instruction, and then passing control back to said specialized hardware processing unit; and said specialized hardware processing unit continuing to parse and execute said instruction stream.

16. A method optimizing execution speed of an instruction stream as recited in claim 15 wherein said specialized hardware processing unit is a graphics processor.

17. A method optimizing execution speed of an instruction stream as recited in claim 15 wherein said instruction stream comes from an encapsulated execute buffer comprised of said instruction stream and a plurality of vertices that together form a vertex pool, said instruction stream rendering said vertices.

18. A computer program product for use in a high speed graphics computer comprising a central processing unit (CPU) and at least one specialized hardware processor for parsing and executing a portion of an instruction stream comprised of a plurality of instructions, said computer program product comprising:

a computer readable medium;

program code means embodied in said computer readable medium for causing said CPU to allocate execution of said instruction stream between the CPU and the at least one specialized graphics hardware processor to optimize execution speed of the instruction stream, said program code means comprising:

means for determining which instructions are implemented by said at least one specialized hardware processor so that instructions in said instruction stream that are implemented by said at least one specialized hardware processor can be identified;

means for emulating at least the instructions of said instruction stream that are not implemented by the at least one specialized hardware processor and then after emulating said portion, prior to giving control to said specialized hardware processor, parsing the next instruction to see if the next instruction is implemented by the specialized hardware processor; and means for parsing any of the instructions in the instruction stream so that said means for parsing can identify all instructions of said instruction stream and then after emulating said portion, prior to giving control to said specialized hardware processor, parsing the next instruction to see if the next instruction is implemented by the specialized hardware processor.

19. A computer program product as recited in claim 18 wherein the program code means further comprises means for causing said at least one specialized hardware processor to begin parsing and executing the instructions of the instruction stream.

20. A computer program product as recited in claim 18 wherein said instruction stream comes from an encapsulated execute buffer comprised of said instruction stream and a plurality of vertices that together form a vertex pool, said instruction stream rendering said vertices.

21. A computer program product as recited in claim 18 wherein said program code means further comprises means for taking control of executing said instruction stream when said at least one specialized hardware processor encounters an unimplemented instruction.

22. A computer program product as recited in claim 18 wherein said means for emulating emulates the entire instruction set.

23. A computer program product for use in a high speed graphics computer comprising a central processing unit (CPU) and at least one specialized hardware processor for parsing and executing a portion of an instruction stream comprised of a plurality of instructions drawn from an instruction set, said computer program product comprising:

a computer readable medium;

program code means embodied in said computer readable medium for causing said CPU to allocate execution of said instruction stream between the CPU and the at least one specialized graphics hardware processor to optimize execution speed of the instruction stream, said program code means comprising:
  means for determining which instructions are implemented by said at least one specialized hardware processor so that instructions in said instruction stream that are implemented by said at least one specialized hardware processor can be identified;
  means for emulating that portion of the instructions of said instruction stream that are not implemented by the at least one specialized hardware processor and then after emulating said portion, prior to giving control to said specialized hardware processor, parsing the next instruction to see if the next instruction is implemented by the specialized hardware processor;
  means for causing said at least one specialized hardware processor to begin parsing and executing the instructions of the instruction stream; and
  means for parsing any of the instructions of said instruction stream and for employing said means for emulating to emulate that portion of the instructions of said instruction stream that are not implemented by the at least one specialized hardware processor and then after emulating said portion, prior to giving control to said specialized hardware processor, parsing the next instruction to see if the next instruction is implemented by the specialized hardware processor.

24. A computer program product as recited in claim 23 wherein said program code means further comprises means for taking control of executing said instruction stream when said at least one specialized hardware processor encounters an unimplemented instruction.

25. A computer program product as recited in claim 24 wherein said instruction stream comes from an encapsulated execute buffer comprised of said instruction stream and a plurality of vertices that together form a vertex pool.

26. A computer program product as recited in claim 23 wherein said means for emulating emulates the entire instruction set.

27. A computer program product for use in a computer comprising a central processing unit (CPU) and a graphics processor for parsing and executing a portion of an instruction stream comprised of graphics instructions drawn from an graphics instruction set, said computer program product comprising:
  a computer readable medium;
  program code means embodied in said computer readable medium for causing said computer to allocate execution of said instruction stream between said graphics processor and an instruction execution unit means running on the CPU, said program code means comprising:
    instruction execution unit means for executing at least the instructions of said instruction set that are not executed by said graphics processor, said instruction execution unit means comprising:
      means for emulating at least the instructions of said instruction set that are not executed by said graphics processor; and
      means for parsing any of the instructions of said instruction set and then after emulating said instructions not executed by said graphics processor, prior to causing said graphics processor to begin execution, paring the next instruction to see if the next instruction is executable by the graphics processor;
    means for determining which portion of the instruction set is implemented by said graphics processor so that said instruction execution unit can determine which instructions in said instruction stream are implemented by said graphics processor; and
    means for causing said graphics processor to begin parsing and executing the instructions of the instruction stream.

28. A high speed graphics system that allocates execution of an instruction stream comprised of a plurality of instructions between a caller instruction execution unit that emulates instructions and a hardware instruction execution unit with high speed graphics hardware comprising:
  a CPU;
  a hardware instruction execution unit for executing a portion of the instruction stream, said hardware instruction execution unit comprising a hardware parser and high speed graphics hardware;
  program code means for causing said CPU to allocate execution of said instruction stream between said hardware instruction execution unit and a caller instruction execution unit, said program code means comprising:
    means for causing said caller instruction execution unit to execute at least the instructions of said instruction stream that are not executed by said hardware instruction execution unit, said caller instruction execution unit comprising:
      means for emulating at least the instructions of said instruction stream that are not executed by said hardware instruction execution unit; and
      means for parsing any of the instructions of said instruction stream and then after emulating said instructions not executed by said high speed graphics hardware, prior to causing said high speed graphics hardware to begin execution, parsing the next instruction to see if the next instruction is executable by the high speed graphics hardware.

29. A high speed graphics system as recited in claim 28 wherein said program code means further comprises means for determining which portion of the instruction stream is implemented by said hardware instruction execution unit.

30. A high speed graphics system as recited in claim 28 wherein said hardware instruction execution unit is a graphics processor.

31. A high speed graphics system as recited in claim 30 wherein said instruction stream comes from an encapsulated execute buffer comprised of said instruction stream and a plurality of vertices that together form a vertex pool, said instruction stream rendering said vertices.

* * * * *

UNITED STATES PATENT AND TRADEMARK OFFICE
CERTIFICATE OF CORRECTION

PATENT NO. : 5,822,570
DATED : Oct. 13, 1998
INVENTOR(S): Steve Lacey

It is certified that error appears in the above-identified patent and that said Letters Patent is hereby corrected as shown below:

Col. 9, line 42, after "processor" insert --or--

Col. 10, line 14, after "requires" change "direct" to --directly--

Col. 12, line 2, after "three-dimensional" change "graphic" to --graphical--

Col. 12, line 17, after "dimensional" change "graphic" to --graphical--

Col. 16, line 40, after "important" insert --to--

Col. 20, line 57, after "block 94 then" change "retrieves and parses" to --retrieve and parse--

Col. 23, line 14, before "high speed" delete "the"

Signed and Sealed this

Seventh Day of March, 2000

Attest:

Q. TODD DICKINSON

Attesting Officer

Commissioner of Patents and Trademarks